United States Patent
Purkayastha et al.

(10) Patent No.: US 12,010,749 B2
(45) Date of Patent: Jun. 11, 2024

(54) SECONDARY CELL GROUP ACTIVATION BY BANDWIDTH PART FOR DUAL CONNECTIVITY WITH MULTIPLE RADIO ACCESS TECHNOLOGIES

(71) Applicant: QUALCOMM Incorporated, San Diego, CA (US)

(72) Inventors: Punyaslok Purkayastha, San Diego, CA (US); Ravi Agarwal, San Diego, CA (US); Gavin Bernard Horn, La Jolla, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 17/304,411

(22) Filed: Jun. 21, 2021

(65) Prior Publication Data

US 2022/0007446 A1    Jan. 6, 2022

Related U.S. Application Data

(60) Provisional application No. 63/047,200, filed on Jul. 1, 2020.

(51) Int. Cl.
*H04W 72/54* (2023.01)
*H04W 24/08* (2009.01)
(Continued)

(52) U.S. Cl.
CPC .......... *H04W 76/16* (2018.02); *H04W 24/08* (2013.01); *H04W 56/001* (2013.01);
(Continued)

(58) Field of Classification Search
None
See application file for complete search history.

(56) References Cited

U.S. PATENT DOCUMENTS

| 2014/0192775 A1* | 7/2014 | Li .................... H04W 74/006 |
| | | 370/331 |
| 2016/0119930 A1 | 4/2016 | Yan et al. |

(Continued)

OTHER PUBLICATIONS

International Search Report and Written Opinion—PCT/US2021/070745—ISA/EPO—dated Oct. 8, 2021.

(Continued)

*Primary Examiner* — Sithu Ko
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may operate, in connection with a secondary cell group (SCG) for multiple radio access technology dual connectivity, in one of an SCG dormant state in a dormant downlink bandwidth part (BWP) configured for a primary secondary cell of the SCG or an SCG enhanced dormant state in an enhanced dormant downlink BWP configured for the primary secondary cell. The UE may receive a control message associated with activating the SCG for the UE, the control message indicating a BWP switch for the UE. The UE may switch, in connection with receiving the control message, from one of the dormant downlink BWP or the enhanced dormant downlink BWP to an activated downlink BWP in which the UE operates in an SCG activated state. Numerous other aspects are provided.

26 Claims, 7 Drawing Sheets

(51) Int. Cl.
  *H04W 56/00* (2009.01)
  *H04W 72/0453* (2023.01)
  *H04W 72/23* (2023.01)
  *H04W 76/16* (2018.01)
  *H04W 80/02* (2009.01)

(52) U.S. Cl.
  CPC ....... *H04W 72/0453* (2013.01); *H04W 72/23* (2023.01); *H04W 72/54* (2023.01); *H04W 80/02* (2013.01)

(56) References Cited

U.S. PATENT DOCUMENTS

| | | | | |
|---|---|---|---|---|
| 2018/0049186 A1* | 2/2018 | Hong | | H04L 5/0032 |
| 2019/0124558 A1* | 4/2019 | Ang | | H04W 24/02 |
| 2019/0254110 A1* | 8/2019 | He | | H04W 76/28 |
| 2019/0305867 A1* | 10/2019 | Tseng | | H04L 5/0094 |
| 2019/0306739 A1* | 10/2019 | Kim | | H04L 5/0096 |
| 2020/0029316 A1* | 1/2020 | Zhou | | H04W 74/0833 |
| 2020/0037248 A1* | 1/2020 | Zhou | | H04B 7/022 |
| 2020/0235896 A1* | 7/2020 | Lee | | H04L 5/0098 |
| 2021/0045147 A1* | 2/2021 | Zhou | | H04W 72/23 |
| 2021/0051767 A1* | 2/2021 | Zhang | | H04W 76/34 |
| 2021/0185614 A1* | 6/2021 | Zhou | | H04L 5/0051 |
| 2021/0352580 A1* | 11/2021 | Zhou | | H04W 72/23 |
| 2022/0030659 A1* | 1/2022 | Kim | | H04W 76/27 |
| 2022/0053589 A1* | 2/2022 | Zhang | | H04W 76/19 |
| 2022/0209920 A1* | 6/2022 | Wu | | H04W 24/08 |
| 2022/0330156 A1* | 10/2022 | Zhou | | H04W 52/0235 |

OTHER PUBLICATIONS

Qualcomm Incorporated, et al., "Discussion on Fast SCell Activation Based on Measurements Prior to Activation in NR", 3GPP TSG RAN WG2 Meeting #106, R2-1905542—Discussion on Fast SCell Activation Based on Measurements Prior to Activation in NR, 3rd Generation Partnership Project (3GPP), Mobile Competence Centre, 650, Route Des Lucio, vol. RAN WG2. No. Reno, Nevada, US, May 13, 2019-May 17, 2019, May 13, 2019 (May 13, 2019), XP051729048, pp. 1-12, Retrieved from the Internet: URL:http://www.3gpp.org/ftp/Meetings%5F3GPP%5FSYNC/RAN2/Docs/R2%2D1905542%2Ezip [retrieved on May 13, 2019] the Whole Document, Sections 1-2.

* cited by examiner

| Deactivated | Dormant | Enhanced Dormant | Activated |
|---|---|---|---|
| • No PDCCH monitoring on PSCell<br>• No UL transmissions on PSCell<br>• No CSI measurements on PSCell<br>• Does not maintain UL timing alignment with the SN<br>• Performs RRM measurements on PSCell. Measurement reports transmitted on MCG<br>• No RLM measurements | • No PDCCH monitoring on PSCell<br>• No UL transmissions on PSCell<br>• Performs CSI measurements on PSCell. No CSI reports to network<br>• Does not maintain UL timing alignment with the SN<br>• Performs RRM measurements on PSCell. Measurement reports transmitted on MCG<br>• No RLM measurements | • No PDCCH monitoring on PSCell<br>• Performs CSI measurements on PSCell<br>• Transmits CSI reports on PSCell PUCCH<br>• Maintains UL timing with the SN<br>• Performs RRM measurements on PSCell. Measurement reports transmitted on MCG<br>• No RLM measurements | • UE receives PDCCH on PSCell<br>• Regular data transfer (UL, DL) can take place over PSCell |

FIG. 3

SECONDARY CELL GROUP ACTIVATION BY BANDWIDTH PART FOR DUAL CONNECTIVITY WITH MULTIPLE RADIO ACCESS TECHNOLOGIES

CROSS-REFERENCE TO RELATED APPLICATION

This Patent Application claims priority to U.S. Provisional Patent Application No. 63/047,200, filed on Jul. 1, 2020, entitled "SECONDARY CELL GROUP ACTIVATION BY BANDWIDTH PART FOR DUAL CONNECTIVITY WITH MULTIPLE RADIO ACCESS TECHNOLOGIES," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for secondary cell group activation by bandwidth part for dual connectivity with multiple radio access technologies.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication performed by a user equipment (UE) may include operating, in connection with a secondary cell group (SCG) for multiple radio access technology dual connectivity (MR-DC), in one of an SCG dormant state in a dormant downlink bandwidth part (BWP) configured for a primary secondary cell of the SCG or an SCG enhanced dormant state in an enhanced dormant downlink BWP configured for the primary secondary cell. The method may include receiving a control message associated with activating the SCG for the UE, the control message indicating a BWP switch for the UE, and switching, in connection with receiving the control message, from one of the dormant downlink BWP or the enhanced dormant downlink BWP to an activated downlink BWP in which the UE operates in an SCG activated state.

In some aspects, a method of wireless communication performed by a network node may include determining to instruct a UE to enter into one of an SCG dormant state, an SCG enhanced dormant state, or an SCG activated state, in connection with MR-DC. The method may include transmitting a control message to the UE indicating for the UE to switch to one of a dormant downlink BWP configured for a primary secondary cell of the SCG for operating in the SCG dormant state, an enhanced dormant downlink BWP configured for the primary secondary cell for operating in the SCG enhanced dormant state, or an activated downlink BWP configured for the primary secondary cell for operating in the SCG activated state.

In some aspects, a UE for wireless communication includes a memory and one or more processors coupled to the memory. The one or more processors may be configured to operate, in connection with an SCG for MR-DC, in one of an SCG dormant state in a dormant downlink BWP configured for a primary secondary cell of the SCG or an SCG enhanced dormant state in an enhanced dormant downlink BWP configured for the primary secondary cell. The one or more processors may be configured to receive a control message associated with activating the SCG for the UE, the control message indicating a BWP switch for the UE, and switch, in connection with receiving the control message, from one of the dormant downlink BWP or the enhanced dormant downlink BWP to an activated downlink BWP in which the UE operates in an SCG activated state.

In some aspects, a network node for wireless communication may include a memory and one or more processors coupled to the memory. The one or more processors may be configured to determine to instruct a UE to enter into one of an SCG dormant state, an SCG enhanced dormant state, or an SCG activated state, in connection with MR-DC. The one or more processors may be configured to transmit a control message to the UE indicating for the UE to switch to one of a dormant downlink BWP configured for a primary secondary cell of the SCG for operating in the SCG dormant state, an enhanced dormant downlink BWP configured for the primary secondary cell for operating in the SCG enhanced dormant state, or an activated downlink BWP configured for the primary secondary cell for operating in the SCG activated state.

In some aspects, a non-transitory computer-readable medium storing a set of instructions for wireless communication may include one or more instructions that, when executed by one or more processors of a UE, cause the UE to operate, in connection with an SCG for MR-DC, in one of an SCG dormant state in a dormant downlink BWP configured for a primary secondary cell of the SCG or an SCG enhanced dormant state in an enhanced dormant downlink BWP configured for the primary secondary cell. The one or more instructions may cause the UE to receive a control message associated with activating the SCG for the UE, the control message indicating a BWP switch for the UE, and switch, in connection with receiving the control message, from one of the dormant downlink BWP or the enhanced dormant downlink BWP to an activated downlink BWP in which the UE operates in an SCG activated state.

In some aspects, a non-transitory computer-readable medium storing a set of instructions for wireless communication may include one or more instructions that, when executed by one or more processors of a network node, cause the network node to determine to instruct a UE to enter into one of an SCG dormant state, an SCG enhanced dormant state, or an SCG activated state, in connection with MR-DC, and transmit a control message to the UE indicating for the UE to switch to one of a dormant downlink BWP configured for a primary secondary cell of the SCG for operating in the SCG dormant state, an enhanced dormant downlink BWP configured for the primary secondary cell for operating in the SCG enhanced dormant state, or an activated downlink BWP configured for the primary secondary cell for operating in the SCG activated state.

In some aspects, an apparatus for wireless communication may include means for operating, in connection with an SCG for MR-DC, in one of an SCG dormant state in a dormant downlink BWP configured for a primary secondary cell of the SCG or an SCG enhanced dormant state in an enhanced dormant downlink BWP configured for the primary secondary cell, means for receiving a control message associated with activating the SCG for the apparatus, the control message indicating a BWP switch for the apparatus, and means for switching, in connection with receiving the control message, from one of the dormant downlink BWP or the enhanced dormant downlink BWP to an activated downlink BWP in which the apparatus operates in an SCG activated state.

In some aspects, an apparatus for wireless communication may include means for determining to instruct a UE to enter into one of an SCG dormant state, an SCG enhanced dormant state, or an SCG activated state, in connection with MR-DC, and means for transmitting a control message to the UE indicating for the UE to switch to one of a dormant downlink BWP configured for a primary secondary cell of the SCG for operating in the SCG dormant state, an enhanced dormant downlink BWP configured for the primary secondary cell for operating in the SCG enhanced dormant state, or an activated downlink BWP configured for the primary secondary cell for operating in the SCG activated state.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example associated with secondary cell group (SCG) states of a UE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
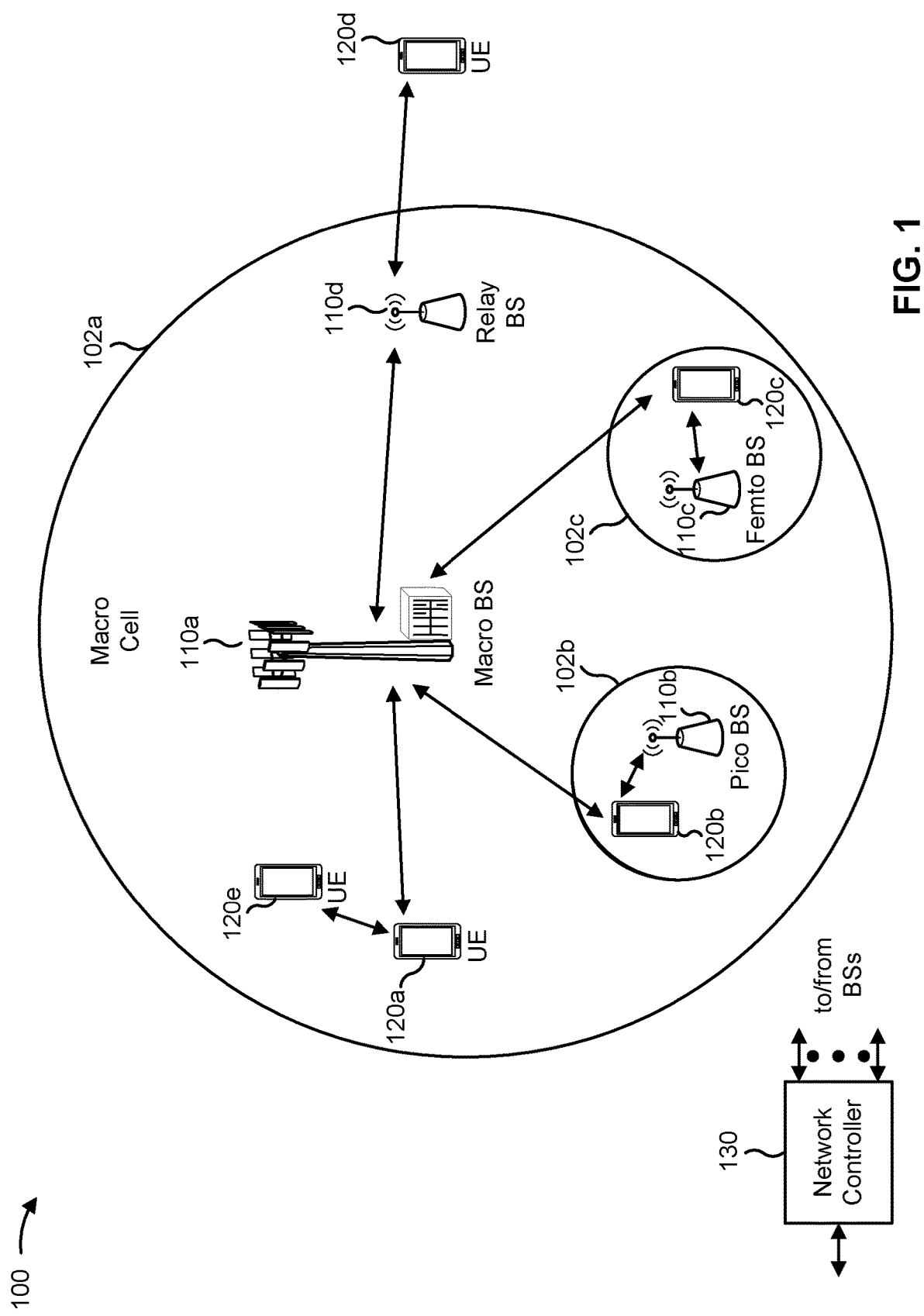
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
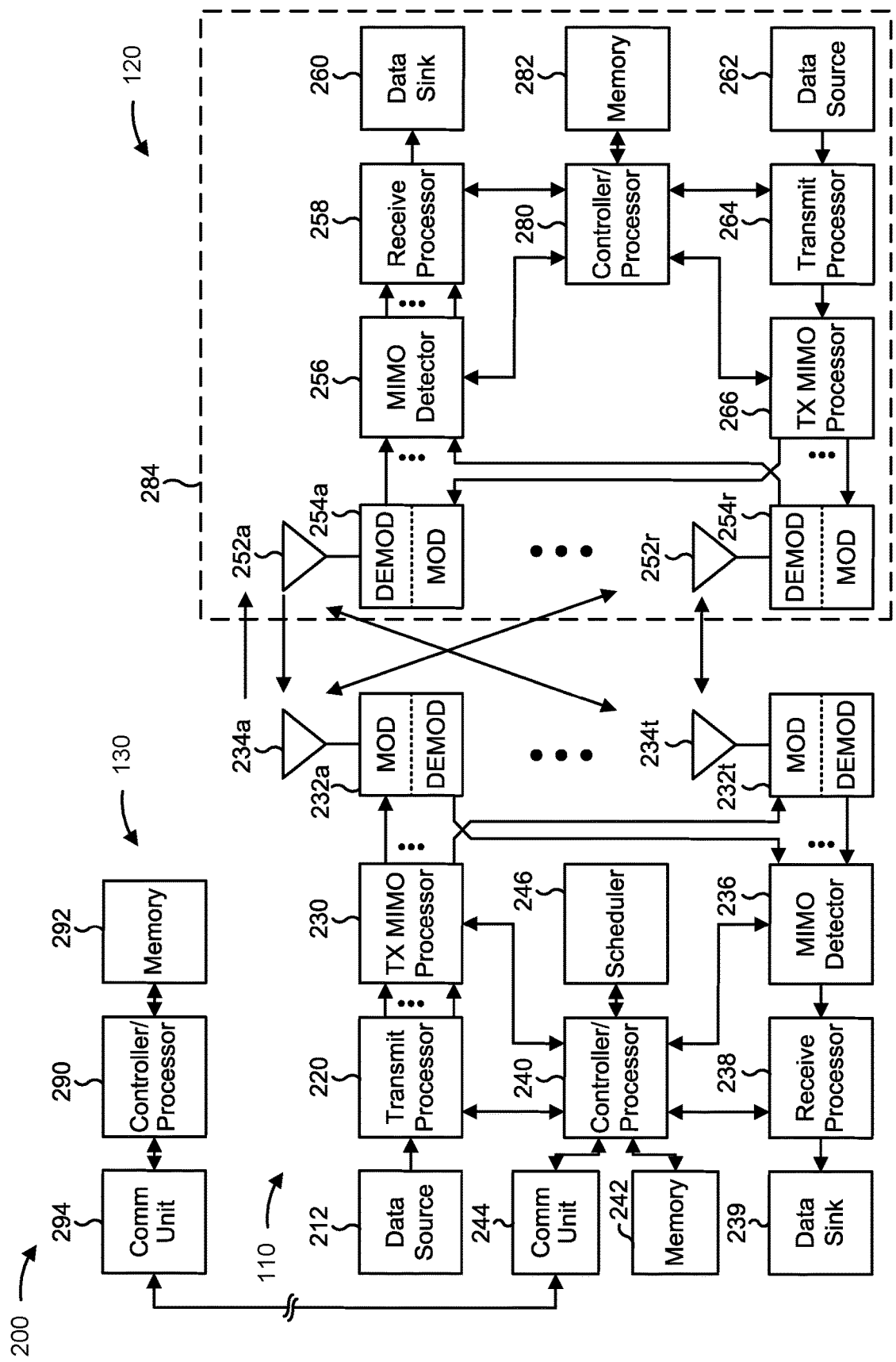
FIG. 2 is a diagram illustrating an example of a base station in communication with a user equipment (UE) in a wireless network, in accordance with present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-7). In some aspects, base station 110 may operate as a master node (MN) of a master cell group (MCG) or a secondary node (SN) of a secondary cell group (SCG).

Controller/processor 240 of a network node (e.g., base station 110), controller/processor 280 of UE 120, and/or any other component(s) of FIG. 2 may perform one or more techniques associated with SCG activation by bandwidth part (BWP) for dual connectivity with multiple radio access technologies (MR-DC), as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for operating, in connection with an SCG for MR-DC, in one of an SCG dormant state in a dormant downlink BWP configured for a primary secondary cell (PSCell) of the SCG or an SCG enhanced dormant state in an enhanced dormant downlink BWP configured for the PSCell, means for receiving a control message associated with activating the SCG for the UE, the control message indicating a BWP switch for the UE, means for switching, in connection with receiving the control message, from one of the dormant downlink BWP or the enhanced dormant downlink BWP to an activated downlink BWP in which the UE operates in an SCG activated state, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a network node (e.g., base station 110, MN, SN, and/or the like) may include means for determining to instruct a UE to enter into one of an SCG dormant state, an SCG enhanced dormant state, or an SCG activated state, in connection with MR-DC, means for transmitting a control message to the UE indicating for the UE to switch to one of a dormant downlink BWP configured for a PSCell of the SCG for operating in the SCG dormant state, an enhanced dormant downlink BWP configured for the PSCell for operating in the SCG enhanced dormant state, or an activated downlink BWP configured for the PSCell for operating in the SCG activated state, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIG. 3 is a diagram illustrating an example 300 associated with SCG states of a UE, in accordance with the present disclosure. FIG. 3 shows a table of SCG states, including an SCG deactivated state, an SCG dormant state, an SCG enhanced dormant state, and an SCG activated state.

When a UE is operating in the SCG deactivated state, the UE may refrain from monitoring a physical downlink control channel (PDCCH) on the PSCell, refrain from transmitting uplink communications on the PSCell, refrain from performing channel state information (CSI) measurements on the PSCell, and refrain from maintaining uplink timing alignment with an SN in the PSCell. The UE may also perform radio resource management (RRM) measurements on the PSCell (and transmit reports on the MCG), and refrain from performing radio link monitoring (RLM) measurements.

In some aspects, a UE may be in an SCG dormant state or an SCG enhanced dormant state so that the UE may consume less power and/or minimize a transition delay to an SCG activated state. When a UE is operating in the SCG dormant state, the UE may refrain from monitoring a PDCCH on the PSCell, refrain from transmitting uplink communications on the PSCell, and perform CSI measurements in the dormant downlink BWP on the PSCell, but refrain from transmitting CSI reports for the PSCell. The UE may refrain from maintaining uplink timing alignment with an SN in the PSCell, perform RRM measurements on the PSCell (and transmit reports on the MCG), and refrain from performing RLM measurements.

When a UE is operating in the SCG enhanced dormant state, the UE may refrain from monitoring a PDCCH on the PSCell, perform CSI measurements in the enhanced dormant downlink BWP on the PSCell, transmit CSI reports in a physical uplink control channel (PUCCH) for the PSCell, maintain uplink timing alignment with an SN in the primary secondary cell, perform RRM measurements on the primary secondary cell (and transmit reports on the MCG), and refrain from performing RLM measurements.

When a UE is operating in the SCG activated state, the UE may receive messages on the PDCCH on the PSCell and transfer uplink and/or downlink data over the PSCell. The UE may perform CSI measurements, transmit CSI reports, and maintain uplink timing alignment with an SN in the PSCell. The UE may also perform and report RRM measurements and/or RLM measurements. In other words, when operating in the SCG activated state, the UE may carry out communications using the SCG and perform other operations as expected using an active SCG.

In some aspects, an SCG state of the UE for secondary cells (SCells) may be an SCell deactivated state or an SCell dormant state.

As indicated above, FIG. 3 is provided as an example. Other examples may differ from what is described with respect to FIG. 3.

A UE may transition to an SCG activated state from an SCG deactivated state by receiving a medium access control control element (MAC-CE). Transitioning from an SCG deactivated state to an SCG activated state may take some time because CSI measurements have not been taken, uplink timing has not been aligned with an SN, and a random access channel (RACH) procedure may need to be performed. On the other hand, if a UE remains in an SCG activated state, a significant amount of power is consumed. The UE may operate in an SCG dormant state or an SCG enhanced dormant state, which involves fewer actions than the SCG activated state, but these SCG dormant states may still consume power. Furthermore, a MAC-CE may not be the fastest manner of signaling SCG activation, because the MAC-CE involves sending an acknowledgement. In other words, SCG activation for a UE may consume more power, time, and/or signaling resources than necessary.

According to various aspects described herein, a UE may operate in a BWP configured for a PSCell, where the BWP is dedicated to an SCG state. For example, the UE may operate in an SCG dormant state in a dormant downlink BWP configured for the PSCell, or the UE may operate in an SCG enhanced dormant state in an enhanced dormant downlink BWP configured for the PSCell. In some aspects, the UE may activate an SCG quickly by receiving a control message that indicates that the UE is to switch BWPs. For example, the control message may be downlink control information (DCI) that indicates an SCG activated downlink BWP. The UE may quickly transition from the SCG dormant state or the SCG enhanced dormant state to the SCG activated state by switching from the dormant downlink BWP or the enhanced dormant downlink BWP to the activated downlink BWP. DCI signaling is also quicker than MAC-CE signaling, and thus the UE saves time transitioning to the SCG activated state using DCI signaling. Furthermore, the UE conserves power by performing CSI measurements only in the dormant downlink BWP or the enhanced dormant downlink BWP, rather than in all available bandwidth.

Figure 4:
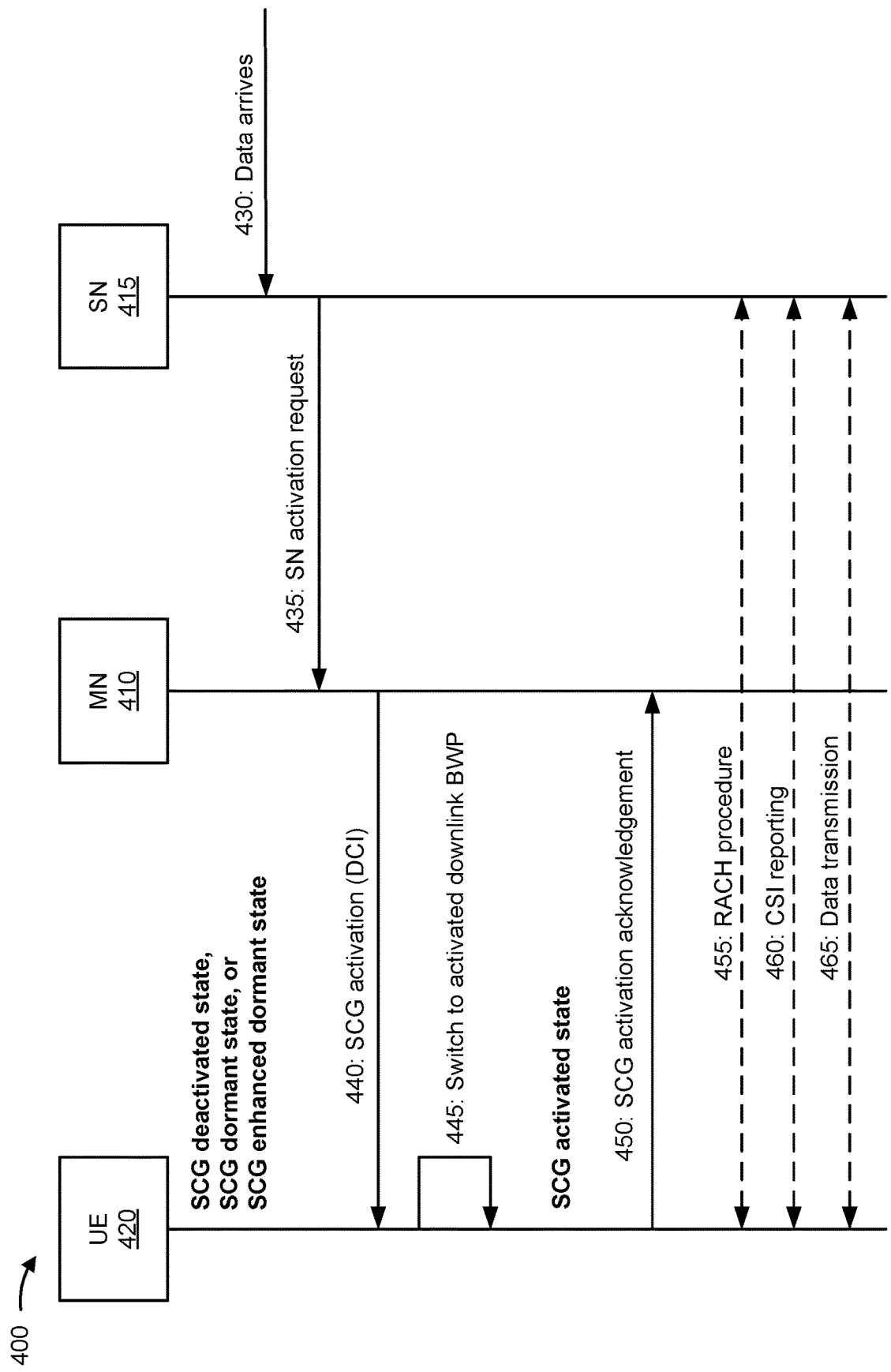
FIG. 4 is a diagram illustrating an example associated with SCG activation by bandwidth part (BWP) for dual connectivity with multiple radio access technologies (MR-DC), in accordance with the present disclosure.

FIG. 4 is a diagram illustrating an example 400 associated with SCG activation by BWP for MR-DC, in accordance with the present disclosure. As shown in FIG. 4, an MN 410 (e.g., a base station 110) of an MCG may communicate with an SN (e.g., a base station 110) of an SCG and a UE 420 (e.g., a UE 120).

UE 420 may receive a trigger to activate an SCG. For example, as shown by reference number 430, data may arrive at SN 415. SN 415 may provide an SN activation request to MN 410, as shown by reference number 435. MN 410 may transmit a control message to UE 420. The control message may be an SCG activation message transmitted via DCI, as shown by reference number 440. The DCI may indicate a BWP to which UE 420 is to switch, or the DCI may provide some other BWP switch indication. In some aspects, the trigger for SCG activation may be that MN 410 receives data on an MN-terminated bearer that requires SCG resources.

UE 420 may switch BWPs based at least in part on the control message. For example, as shown by reference number 445, UE 420 may switch to an activated downlink BWP where UE 420 operates in the SCG activated state. UE 420 may transmit an SCG activation acknowledgement to MN 410, as shown by reference number 450.

Depending on whether UE 420 was in the SCG dormant state or the SCG enhanced dormant state, UE 420 may perform a RACH procedure, as shown by reference number 455. For example, if UE 420 was in the SCG dormant state, UE 420 may perform a RACH procedure after receiving the control message. UE 420, having performed CSI measurements on the PSCell in the SCG dormant state, may continue to perform CSI measurements. After UE 420 completes the RACH procedure, UE 420 may transmit CSI reports, as shown by reference number 460. However, if UE 420 was in the SCG enhanced dormant state, UE 420 does not perform a RACH procedure, but rather proceeds with receiving scheduling information after receiving the control message. UE 420 was already transmitting CSI reports in the SCG enhanced dormant state, and a network node (e.g., MN, SN) may schedule communications using these CSI reports rather than waiting to receive new CSI reports. As shown by reference number 465, UE 420 may begin data transmission. UE 420 may begin data transmission sooner from an SCG enhanced dormant state than from an SCG dormant state. If UE 420 was in an SCG deactivated state, UE 420 would have to start anew with performing CSI reports after initiating a RACH procedure.

As indicated above, FIG. 4 is provided as an example. Other examples may differ from what is described with respect to FIG. 4.

Figure 5:
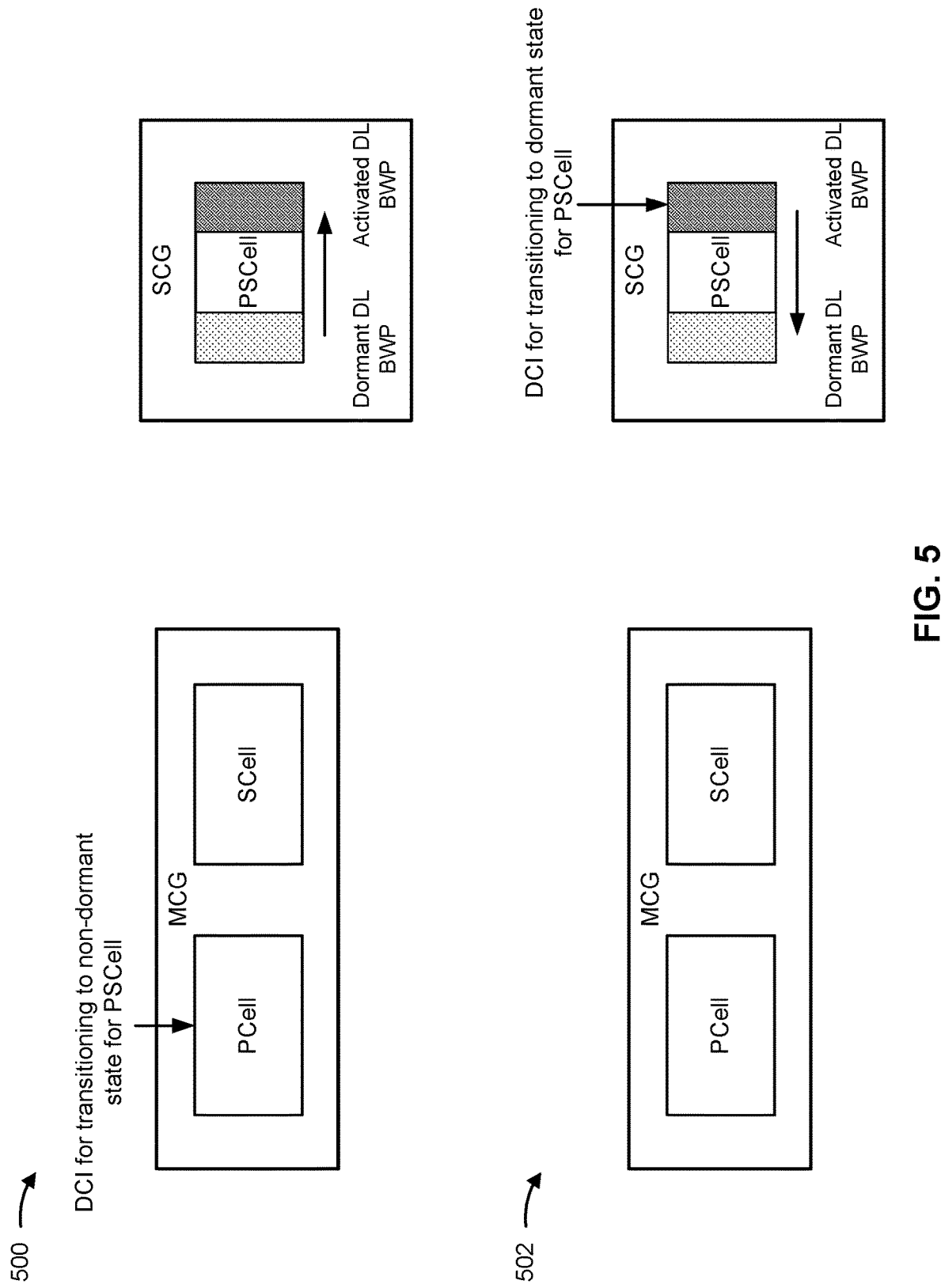
FIG. 5 is a diagram illustrating examples associated with SCG activation by BWP for MR-DC, in accordance with the present disclosure.

FIG. 5 is a diagram illustrating examples 500, 502 associated with SCG activation by BWP for MR-DC, in accordance with the present disclosure. As shown by example 500 in FIG. 5, an MCG for an MN may be associated with an SCG for an SN. The MCG may include a primary cell (PCell) and a secondary cell (SCell). The SCG may include a primary secondary cell (PSCell). In some aspects, the SCG may include other secondary cells.

As shown in FIG. 5, the PSCell may include, for example, a dormant downlink BWP in which the UE operates in an SCG dormant state. The PSCell may include other BWPs, such as for an SCG enhanced dormant state, if bandwidth adaptation is configured for the PSCell. In some aspects, the dormant downlink BWP may be the same as the enhanced dormant downlink BWP.

The PCell of the MCG may receive DCI indicating that the UE is to transition to an SCG activated state. Accordingly, the UE may switch from the dormant downlink BWP to an activated downlink BWP. This BWP switching via DCI, as part of a BWP framework for PSCell dormancy, may provide for faster activation of the PSCell. The BWP framework may involve enhancements to DCI signaling for NR and for LTE (in evolved universal terrestrial radio access with dual connectivity, or EN-DC). In some aspects, MAC-CE signaling may be used for BWP switching where DCI signaling is not available or feasible. In some aspects, a PSCell may be activated together with one or more SCG SCells.

In some aspects, another control message (e.g., a deactivation control message via DCI) may be used to transition the UE from the SCG activated state to the SCG dormant state or the SCG enhanced dormant state. As shown by example 502 in FIG. 5, the UE may receive DCI on the PSCell, indicating for the UE to transition to an SCG dormant state. For example, the DCI may indicate a dormant downlink BWP. The UE may switch from the activated downlink BWP to the dormant downlink BWP. Accordingly, the UE may transition from the SCG activated state to the SCG dormant state. Note that transitions to and from an SCG deactivated state may be performed using a MAC-CE.

As indicated above, FIG. 5 provides some examples. Other examples may differ from what is described with respect to FIG. 5.

Figure 6:
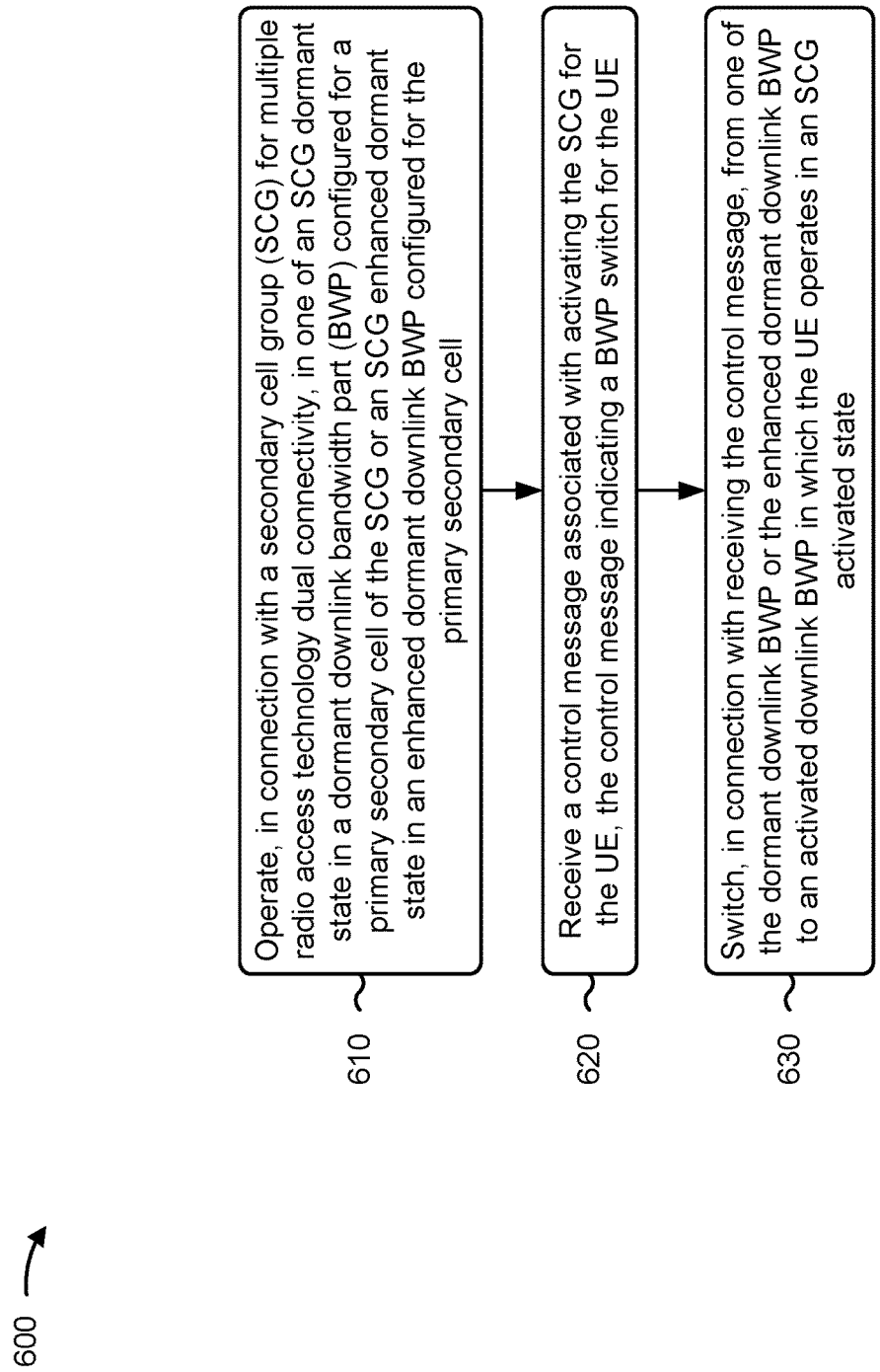
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., a UE 120 depicted in FIGS. 1 and 2, UE 420 depicted in FIG. 4) performs operations associated with SCG activation by BWP for MR-DC.

As shown in FIG. 6, in some aspects, process 600 may include operating, in connection with an SCG for MR-DC, in one of an SCG dormant state in a dormant downlink BWP configured for a PSCell of the SCG or an SCG enhanced dormant state in an enhanced dormant downlink BWP configured for the PSCell (block 610). For example, the UE (e.g., using receive processor 258, transmit processor 264, controller/processor 280, memory 282) may operate, in connection with an SCG for MR-DC, in one of an SCG dormant state in a dormant downlink BWP configured for a PSCell of the SCG or an SCG enhanced dormant state in an enhanced dormant downlink BWP configured for the PSCell, as described above.

As further shown in FIG. 6, in some aspects, process 600 may include receiving a control message associated with activating the SCG for the UE (block 620). For example, the UE (e.g., using receive processor 258, transmit processor 264, controller/processor 280, memory 282) may receive a control message associated with activating the SCG for the UE, as described above. In some aspects, the control message may indicate a BWP switch for the UE.

As further shown in FIG. 6, in some aspects, process 600 may include switching, in connection with receiving the control message, from one of the dormant downlink BWP or the enhanced dormant downlink BWP to an activated downlink BWP in which the UE operates in an SCG activated state (block 630). For example, the UE (e.g., using receive processor 258, transmit processor 264, controller/processor 280, memory 282) may switch, in connection with receiving the control message, from one of the dormant downlink BWP or the enhanced dormant downlink BWP to an activated downlink BWP in which the UE operates in an SCG activated state, as described above.

Process 600 may include additional aspects, such as any single aspect or any combination of aspects described below and/or in connection with one or more other processes described elsewhere herein.

In a first aspect, the control message includes DCI received on a primary cell of an MCG associated with the SCG.

In a second aspect, alone or in combination with the first aspect, the control message includes a MAC-CE received on a primary cell or an activated secondary cell of an MCG associated with the SCG.

In a third aspect, alone or in combination with one or more of the first and second aspects, the UE operating in the SCG dormant state is to refrain from monitoring a PDCCH on the PSCell, refrain from transmitting uplink communications on the PSCell, perform CSI measurements in the dormant downlink BWP on the PSCell, refrain from transmitting CSI reports for the PSCell, refrain from maintaining uplink timing alignment with an SN in the PSCell, perform RRM measurements on the PSCell, and refrain from performing RLM measurements.

In a fourth aspect, alone or in combination with one or more of the first through third aspects, the UE operating in the SCG enhanced dormant state is to refrain from monitoring a PDCCH on the PSCell, perform CSI measurements in the enhanced dormant downlink BWP on the PSCell, transmit CSI reports for the PSCell, maintain uplink timing alignment with an SN in the PSCell, perform RRM measurements on the PSCell, and refrain from performing RLM measurements.

In a fifth aspect, alone or in combination with one or more of the first through fourth aspects, process 600 includes, after entering the SCG activated state from the SCG dormant state, performing a RACH procedure.

In a sixth aspect, alone or in combination with one or more of the first through fifth aspects, process 600 includes, after entering the SCG activated state from the SCG enhanced dormant state, transmitting uplink communications without performing a RACH procedure.

In a seventh aspect, alone or in combination with one or more of the first through sixth aspects, process 600 includes receiving another control message associated with transitioning to the SCG dormant state or the SCG enhanced dormant state, the other control message indicating another BWP switch, and switching, in connection with receiving the other control message, to one of the dormant downlink BWP for operating in the SCG dormant state, or the enhanced dormant downlink BWP for operating in the SCG enhanced dormant state.

In an eighth aspect, alone or in combination with one or more of the first through seventh aspects, process 600 includes receiving a MAC-CE on the PSCell, and transitioning to an SCG deactivated state based at least in part on receiving the MAC-CE.

In a ninth aspect, alone or in combination with one or more of the first through eighth aspects, the UE operating in the SCG deactivated state is to refrain from monitoring a PDCCH on the PSCell, refrain from transmitting uplink communications on the PSCell, refrain from performing CSI measurements on the PSCell, refrain from maintaining uplink timing alignment with an SN in the PSCell, perform RRM measurements on the PSCell, and refrain from performing RLM measurements.

In a tenth aspect, alone or in combination with one or more of the first through ninth aspects, the control message is associated with activating the PSCell and one or more other secondary cells of the SCG.

In an eleventh aspect, alone or in combination with one or more of the first through tenth aspects, process 600 includes receiving a configuration for one or more of the SCG dormant state or the SCG enhanced dormant state in a radio resource control (RRC) configuration message.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
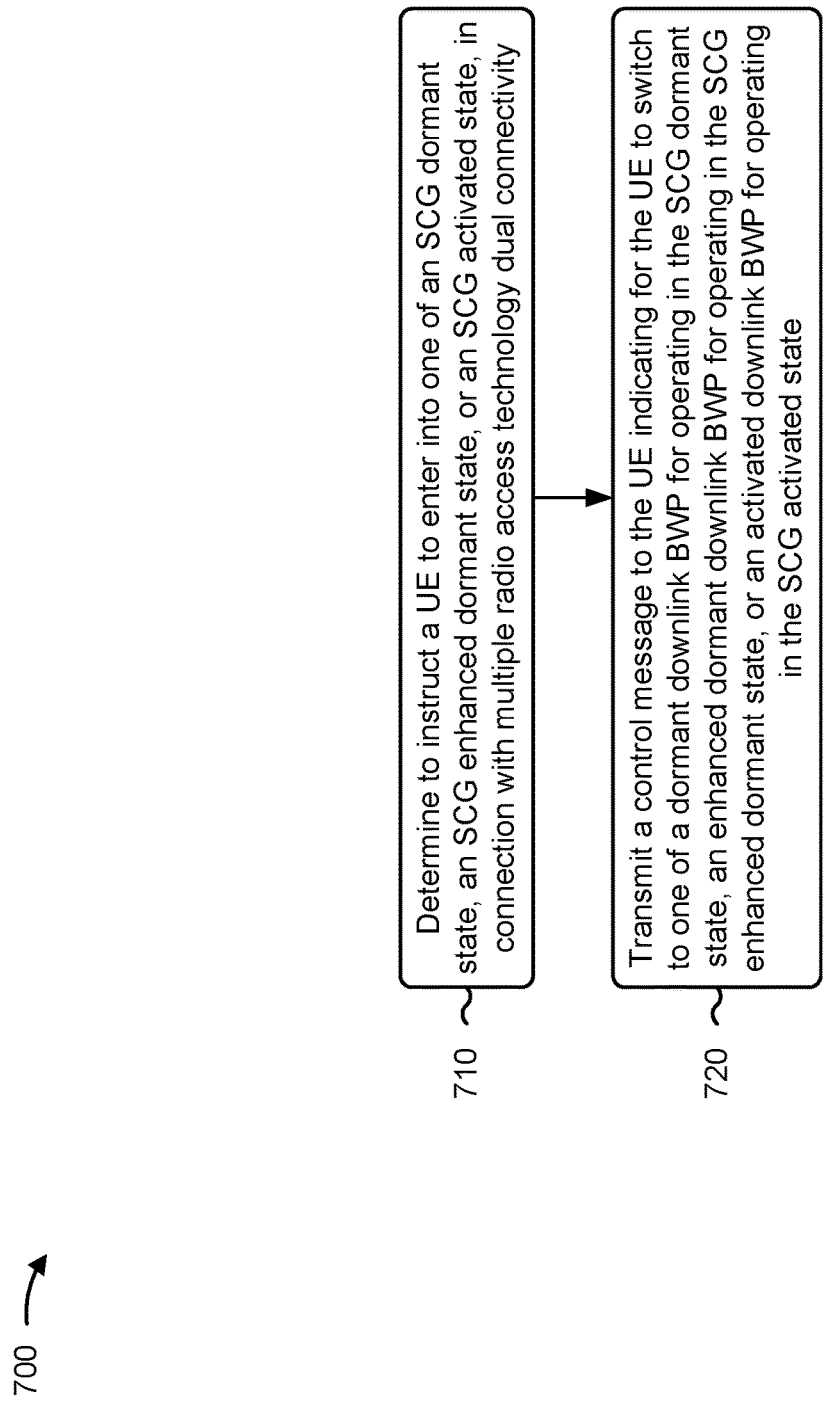
FIG. 7 is a diagram illustrating an example process performed, for example, by a network node, in accordance with the present disclosure.

FIG. 7 is a diagram illustrating an example process 700 performed, for example, by a network node, in accordance with the present disclosure. Example process 700 is an example where the network node (e.g., a base station 110 depicted in FIGS. 1 and 2, MN 410 depicted in FIG. 4, SN 415 depicted in FIG. 4) performs operations associated with SCG activation by BWP for MR-DC.

As shown in FIG. 7, in some aspects, process 700 may include determining to instruct a UE to enter into one of an SCG dormant state, an SCG enhanced dormant state, or an SCG activated state, in connection with MR-DC (block 710). For example, the network node (e.g., using transmit processor 220, receive processor 238, controller/processor 240, memory 242) may determine to instruct a UE to enter into one of an SCG dormant state, an SCG enhanced dormant state, or an SCG activated state, in connection with MR-DC, as described above.

As further shown in FIG. 7, in some aspects, process 700 may include transmitting a control message to the UE indicating for the UE to switch to one of a dormant downlink BWP configured for a PSCell of the SCG for operating in the SCG dormant state, an enhanced dormant downlink BWP configured for the PSCell for operating in the SCG enhanced dormant state, or an activated downlink BWP configured for the PSCell for operating in the SCG activated state (block 720). For example, the network node (e.g., using transmit processor 220, receive processor 238, controller/processor 240, memory 242) may transmit a control message to the UE indicating for the UE to switch to one of a dormant downlink BWP configured for a PSCell of the SCG for operating in the SCG dormant state, an enhanced dormant downlink BWP configured for the PSCell for operating in the SCG enhanced dormant state, or an activated downlink BWP configured for the PSCell for operating in the SCG activated state, as described above.

Process 700 may include additional aspects, such as any single aspect or any combination of aspects described below and/or in connection with one or more other processes described elsewhere herein.

In a first aspect, transmitting the control message includes transmitting the control message via DCI on a primary cell of an MCG associated with the SCG.

In a second aspect, alone or in combination with the first aspect, the control message includes a MAC-CE on a primary cell or an activated secondary cell of an MCG associated with the SCG.

In a third aspect, alone or in combination with one or more of the first and second aspects, the control message is to cause the UE to operate in the SCG dormant state in which the UE is configured to refrain from monitoring a PDCCH on the PSCell, refrain from transmitting uplink communications on the PSCell, perform CSI measurements in the dormant downlink BWP on the PSCell, refrain from transmitting CSI reports for the PSCell, refrain from maintaining uplink timing alignment with an SN in the PSCell, perform RRM measurements on the PSCell, and refrain from performing RLM measurements.

In a fourth aspect, alone or in combination with one or more of the first through third aspects, the control message is to cause the UE to operate in the SCG enhanced dormant state in which the UE is configured to refrain from monitoring a PDCCH on the PSCell, perform CSI measurements in the enhanced dormant downlink BWP on the PSCell, transmit CSI reports for the PSCell, maintain uplink timing alignment with an SN in the PSCell, perform RRM measurements on the PSCell, and refrain from performing RLM measurements.

In a fifth aspect, alone or in combination with one or more of the first through fourth aspects, process 700 includes determining to instruct the UE to enter an SCG deactivated state, and transmitting a MAC-CE on the PSCell, indicating for the UE to transition to the SCG deactivated state.

In a sixth aspect, alone or in combination with one or more of the first through fifth aspects, the MAC-CE is to cause the UE to operate in the SCG deactivated state in which the UE is configured to refrain from monitoring a PDCCH on a PSCell of the SCG, refrain from transmitting uplink communications on the PSCell, refrain from performing CSI measurements on the PSCell, refrain from maintaining uplink timing alignment with an SN in the PSCell, perform RRM measurements on the PSCell, and refrain from performing RLM measurements.

In a seventh aspect, alone or in combination with one or more of the first through sixth aspects, the control message is associated with activating the PSCell and one or more other secondary cells of the SCG.

In an eighth aspect, alone or in combination with one or more of the first through seventh aspects, process 700 includes transmitting an RRC configuration message to the UE that includes a configuration for one or more of the SCG dormant state or the SCG enhanced dormant state.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a user equipment (UE), comprising: operating, in connection with a secondary cell group (SCG) for multiple radio access technology dual connectivity, in one of an SCG dormant state in a dormant downlink bandwidth part (BWP) configured for a primary secondary cell of the SCG or an SCG enhanced dormant state in an enhanced dormant downlink BWP configured for the primary secondary cell; receiving a control message associated with activating the SCG for the UE, the control message indicating a BWP switch for the UE; and switching, in connection with receiving the control message, from one of the dormant downlink BWP or the enhanced dormant downlink BWP to an activated downlink BWP in which the UE operates in an SCG activated state.

Aspect 2: The method of Aspect 1, wherein the control message includes downlink control information received on a primary cell of a master cell group associated with the SCG.

Aspect 3: The method of Aspect 1, wherein the control message includes a medium access control control element (MAC-CE) received on a primary cell or an activated secondary cell of a master cell group associated with the SCG.

Aspect 4: The method of any of Aspects 1-3, wherein the UE operating in the SCG dormant state is to refrain from monitoring a physical downlink control channel on the primary secondary cell, refrain from transmitting uplink communications on the primary secondary cell, perform channel state information (CSI) measurements in the dormant downlink BWP on the primary secondary cell, refrain from transmitting CSI reports for the primary secondary cell, refrain from maintaining uplink timing alignment with a secondary node in the primary secondary cell, perform radio resource management measurements on the primary secondary cell, and refrain from performing radio link monitoring measurements.

Aspect 5: The method of any of Aspects 1-3, wherein the UE operating in the SCG enhanced dormant state is to refrain from monitoring a physical downlink control channel on the primary secondary cell, perform channel state information (CSI) measurements in the enhanced dormant downlink BWP on the primary secondary cell, transmit CSI reports for the primary secondary cell, maintain uplink timing alignment with a secondary node in the primary secondary cell, perform radio resource management measurements on the primary secondary cell, and refrain from performing radio link monitoring measurements.

Aspect 6: The method of any of Aspects 1-5, further comprising, after entering the SCG activated state from the SCG dormant state, performing a random access channel procedure.

Aspect 7: The method of any of Aspects 1-5, further comprising, after entering the SCG activated state from the SCG enhanced dormant state, transmitting uplink communications without performing a random access channel procedure.

Aspect 8: The method of any of Aspects 1-7, further comprising: receiving another control message associated with transitioning to the SCG dormant state or the SCG enhanced dormant state, the other control message indicating another BWP switch; and switching, in connection with receiving the other control message, to one of the dormant downlink BWP for operating in the SCG dormant state, or the enhanced dormant downlink BWP for operating in the SCG enhanced dormant state.

Aspect 9: The method of any of Aspects 1-7, further comprising: receiving a medium access control control element (MAC-CE) on the primary secondary cell; and transitioning to an SCG deactivated state based at least in part on receiving the MAC-CE.

Aspect 10: The method of Aspect 9, wherein the UE operating in the SCG deactivated state is to refrain from monitoring a physical downlink control channel on the primary secondary cell, refrain from transmitting uplink communications on the primary secondary cell, refrain from performing channel state information (CSI) measurements on the primary secondary cell, refrain from maintaining uplink timing alignment with a secondary node in the primary secondary cell, perform radio resource management measurements on the primary secondary cell, and refrain from performing radio link monitoring measurements.

Aspect 11: The method of any of Aspects 1-10, wherein the control message is associated with activating the primary secondary cell and one or more other secondary cells of the SCG.

Aspect 12: The method of any of Aspects 1-11, further comprising receiving a configuration for one or more of the SCG dormant state or the SCG enhanced dormant state in a radio resource control configuration message.

Aspect 13: A method of wireless communication performed by a network node, comprising: determining to instruct a user equipment (UE) to enter into one of a secondary cell group (SCG) dormant state, an SCG enhanced dormant state, or an SCG activated state, in connection with multiple radio access technology dual connectivity; and transmitting a control message to the UE indicating for the UE to switch to one of a dormant downlink bandwidth part (BWP) configured for a primary secondary cell of the SCG for operating in the SCG dormant state, an enhanced dormant downlink BWP configured for the primary secondary cell for operating in the SCG enhanced dormant state, or an activated downlink BWP configured for the primary secondary cell for operating in the SCG activated state.

Aspect 14: The method of Aspect 13, wherein transmitting the control message includes transmitting the control message via downlink control information on a primary cell of a master cell group associated with the SCG.

Aspect 15: The method of Aspect 13, wherein the control message includes a medium access control control element (MAC-CE) on a primary cell or an activated secondary cell of a master cell group associated with the SCG.

Aspect 16: The method of any of Aspects 13-15, wherein the control message is to cause the UE to operate in the SCG dormant state in which the UE is configured to refrain from monitoring a physical downlink control channel on the primary secondary cell, refrain from transmitting uplink communications on the primary secondary cell, perform channel state information (CSI) measurements in the dormant downlink BWP on the primary secondary cell, refrain from transmitting CSI reports for the primary secondary cell, refrain from maintaining uplink timing alignment with a secondary node in the primary secondary cell, perform radio resource management measurements on the primary secondary cell, and refrain from performing radio link monitoring measurements.

Aspect 17: The method of any of Aspects 13-16, wherein the control message is to cause the UE to operate in the SCG enhanced dormant state in which the UE is configured to refrain from monitoring a physical downlink control channel on the primary secondary cell, perform channel state information (CSI) measurements in the enhanced dormant downlink BWP on the primary secondary cell, transmit CSI reports for the primary secondary cell, maintain uplink timing alignment with a secondary node in the primary secondary cell, perform radio resource management measurements on the primary secondary cell, and refrain from performing radio link monitoring measurements.

Aspect 18: The method of any of Aspects 13-16, further comprising: determining to instruct the UE to enter an SCG deactivated state; and transmitting a medium access control control element (MAC-CE) on the primary secondary cell, indicating for the UE to transition to the SCG deactivated state.

Aspect 19: The method of Aspect 18, wherein the MAC-CE is to cause the UE to operate in the SCG deactivated state in which the UE is configured to refrain from monitoring a physical downlink control channel on a primary secondary cell of the SCG, refrain from transmitting uplink communications on the primary secondary cell, refrain from performing channel state information (CSI) measurements on the primary secondary cell, refrain from maintaining uplink timing alignment with a secondary node in the primary secondary cell, perform radio resource management measurements on the primary secondary cell, and refrain from performing radio link monitoring measurements.

Aspect 20: The method of any of Aspects 13-19, wherein the control message is associated with activating the primary secondary cell and one or more other secondary cells of the SCG.

Aspect 21: The method of any of Aspects 13-20, further comprising transmitting a radio resource control configuration message to the UE that includes a configuration for one or more of the SCG dormant state or the SCG enhanced dormant state.

Aspect 22: An apparatus for wireless communication at a device, comprising a processor; memory coupled with the processor; and instructions stored in the memory and executable by the processor to cause the apparatus to perform the method of one or more of Aspects 1-21.

Aspect 23: A device for wireless communication, comprising a memory and one or more processors coupled to the memory, the one or more processors configured to perform the method of one or more of Aspects 1-21.

Aspect 24: An apparatus for wireless communication, comprising at least one means for performing the method of one or more of Aspects 1-21.

Aspect 25: A non-transitory computer-readable medium storing code for wireless communication, the code comprising instructions executable by a processor to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software.

The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      operate, in connection with a secondary cell group (SCG) for multiple radio access technology dual connectivity, in an SCG deactivated state in a downlink bandwidth part (BWP) configured for a primary secondary cell of the SCG;
      receive a control message associated with activating the SCG for the UE, the control message indicating a BWP switch for the UE;

switch, in connection with receiving the control message, from the downlink BWP to an activated downlink BWP in which the UE operates in an SCG activated state; and
transmit, after entering the SCG activated state from the SCG deactivated state, uplink communications without performing a random access channel procedure.

2. The UE of claim 1, wherein the control message includes downlink control information received on a primary cell of a master cell group associated with the SCG.

3. The UE of claim 1, wherein the control message includes a medium access control control element (MAC-CE) received on a primary cell or an activated secondary cell of a master cell group associated with the SCG.

4. The UE of claim 1, wherein the one or more processors are configured to, after entering the SCG activated state from the SCG deactivated state, perform a random access channel procedure.

5. The UE of claim 1, wherein the one or more processors are configured to:
receive another control message associated with transitioning to the SCG deactivated state, the another control message indicating another BWP switch; and
switch, in connection with receiving the another control message, to the downlink BWP for operating in the SCG deactivated state.

6. The UE of claim 1, wherein the one or more processors are configured to:
receive a medium access control control element (MAC-CE) on the primary secondary cell; and
transition to the SCG deactivated state based at least in part on receiving the MAC-CE.

7. The UE of claim 1, wherein the UE operating in the SCG deactivated state is to refrain from monitoring a physical downlink control channel on the primary secondary cell, refrain from transmitting uplink communications on the primary secondary cell, refrain from performing channel state information (CSI) measurements on the primary secondary cell, refrain from maintaining uplink timing alignment with a secondary node in the primary secondary cell, and perform radio resource management measurements on the primary secondary cell.

8. The UE of claim 1, wherein the control message is associated with activating the primary secondary cell and one or more other secondary cells of the SCG.

9. A network node for wireless communication, comprising:
one or more memories; and
one or more processors, coupled to the one or more memories, configured to:
determine to instruct a user equipment (UE) to enter into a secondary cell group (SCG) deactivated state or an SCG activated state, in connection with multiple radio access technology dual connectivity;
transmit a control message to the UE indicating for the UE to switch to a deactivated downlink bandwidth part (BWP) configured for a primary secondary cell of the SCG for operating in the SCG deactivated state or an activated downlink BWP configured for the primary secondary cell for operating in the SCG activated state;
determine to instruct the UE to enter the SCG deactivated state; and
transmit a medium access control control element (MAC-CE) on the primary secondary cell, indicating for the UE to transition to the SCG deactivated state,
wherein the MAC-CE is to cause the UE to operate in the SCG deactivated state in which the UE is configured to refrain from monitoring a physical downlink control channel on a primary secondary cell of the SCG, refrain from transmitting uplink communications on the primary secondary cell, refrain from performing channel state information (CSI) measurements on the primary secondary cell, refrain from maintaining uplink timing alignment with a secondary node in the primary secondary cell, and perform radio resource management measurements on the primary secondary cell.

10. The network node of claim 9, wherein the one or more processors, to transmit the control message, are configured to transmit the control message via downlink control information on a primary cell of a master cell group associated with the SCG.

11. The network node of claim 9, wherein the control message includes a medium access control control element (MAC-CE) on a primary cell or an activated secondary cell of a master cell group associated with the SCG.

12. The network node of claim 9, wherein the control message is associated with activating the primary secondary cell and one or more other secondary cells of the SCG.

13. A method of wireless communication performed by a user equipment (UE), comprising:
operating, in connection with a secondary cell group (SCG) for multiple radio access technology dual connectivity, in an SCG deactivated state in a downlink bandwidth part (BWP) configured for a primary secondary cell of the SCG;
receiving a control message associated with activating the SCG for the UE, the control message indicating a BWP switch for the UE;
switching, in connection with receiving the control message, from the downlink BWP to an activated downlink BWP in which the UE operates in an SCG activated state; and
transmit, after entering the SCG activated state from the SCG deactivated state, uplink communications without performing a random access channel procedure.

14. The method of claim 13, further comprising:
receiving another control message associated with transitioning to the SCG deactivated state, the another control message indicating another BWP switch; and
switching, in connection with receiving the another control message, to the deactivated downlink BWP for operating in the SCG deactivated state.

15. The method of claim 13, further comprising:
receiving a medium access control control element (MAC-CE) on the primary secondary cell; and
transitioning to the SCG deactivated state based at least in part on receiving the MAC-CE.

16. The method of claim 13, wherein the control message is associated with activating the primary secondary cell and one or more other secondary cells of the SCG.

17. The method of claim 13, wherein the control message includes downlink control information received on a primary cell of a master cell group associated with the SCG.

18. The method of claim 13, wherein the control message includes a medium access control control element (MAC-CE) received on a primary cell or an activated secondary cell of a master cell group associated with the SCG.

19. The method of claim 13, further comprising:
after entering the SCG activated state from the SCG deactivated state, performing a random access channel procedure.

20. The method of claim 13, further comprising:
after entering the SCG activated state from the SCG deactivated state, transmitting uplink communications without performing a random access channel procedure.

21. The method of claim 13, wherein transitioning to the SCG deactivated state comprises operating in the SCG deactivated state, in which the UE is configured to refrain from monitoring a physical downlink control channel on a primary secondary cell of the SCG, refrain from transmitting uplink communications on the primary secondary cell, refrain from performing channel state information (CSI) measurements on the primary secondary cell, refrain from maintaining uplink timing alignment with a secondary node in the primary secondary cell, and perform radio resource management measurements on the primary secondary cell.

22. A method of wireless communication performed by a network node, comprising:
determining to instruct a user equipment (UE) to enter into a secondary cell group (SCG) deactivated state or an SCG activated state, in connection with multiple radio access technology dual connectivity;
transmitting a control message to the UE indicating for the UE to switch to a deactivated downlink bandwidth part (BWP) configured for a primary secondary cell of the SCG for operating in the SCG deactivated state or an activated downlink BWP configured for the primary secondary cell for operating in the SCG activated state;
transmitting a medium access control control element (MAC-CE) on the primary secondary cell, indicating for the UE to transition to the SCG deactivated state, wherein the MAC-CE is to cause the UE to operate in the SCG deactivated state in which the UE is configured to refrain from monitoring a physical downlink control channel on a primary secondary cell of the SCG, refrain from transmitting uplink communications on the primary secondary cell, refrain from performing channel state information (CSI) measurements on the primary secondary cell, refrain from maintaining uplink timing alignment with a secondary node in the primary secondary cell, and perform radio resource management measurements on the primary secondary cell.

23. The method of claim 22, further comprising:
determining to instruct the UE to enter the SCG deactivated state; and
transmitting the MAC-CE on the primary secondary cell, indicating for the UE to transition to the SCG deactivated state.

24. The method of claim 22, wherein the UE operating in the SCG deactivated state is to refrain from monitoring a physical downlink control channel on the primary secondary cell, refrain from transmitting uplink communications on the primary secondary cell, refrain from performing channel state information (CSI) measurements on the primary secondary cell, refrain from maintaining uplink timing alignment with a secondary node in the primary secondary cell, and perform radio resource management measurements on the primary secondary cell.

25. The method of claim 22, further comprising:
transmitting the control message via downlink control information on a primary cell of a master cell group associated with the SCG.

26. The method of claim 22, wherein the control message includes the MAC-CE on a primary cell or an activated secondary cell of a master cell group associated with the SCG.

* * * * *